March 9, 1943.　　　O. H. LUDEMAN　　　2,313,448
VALVE
Filed March 26, 1940　　　2 Sheets-Sheet 1

INVENTOR
Oscar H. Ludeman
BY
Riddle, Bedell and Montgomery
ATTORNEYS.

March 9, 1943.　　　O. H. LUDEMAN　　　2,313,448
VALVE
Filed March 26, 1940　　2 Sheets-Sheet 2

INVENTOR
Oscar H. Ludeman
BY
ATTORNEYS.

Patented Mar. 9, 1943

2,313,448

UNITED STATES PATENT OFFICE 2,313,448

VALVE

Oscar H. Ludeman, Rye, N. Y.

Application March 26, 1940, Serial No. 325,967

3 Claims. (Cl. 137—139)

This invention relates to an improvement in valve mechanism, and is directed particularly to an improvement in valve mechanism embodying a normally operating valve, such as a throttle valve, and a separate valve, such as an emergency shut-off valve, operating in connection with the throttle valve, the arrangement being such that after closure of the separate valve, followed by closure of the normally operating valve, the separate valve will automatically reopen. As a consequence when the normally operating valve is reset the equipment is again ready for use.

One of the objects of my invention is the provision of valve mechanism such as above described, in which the number of parts and friction points have been reduced to a minimum, the emergency side being entirely free from packing, stuffing boxes or snap rings; a construction in which no servicing is required of the separate valve, there being no parts to "freeze" or stick and no adjustments to be made; a construction requiring no weights, latches or trips; and a construction operable equally well with steam, gas, oil or other fluids, and in any position.

Figure 1:
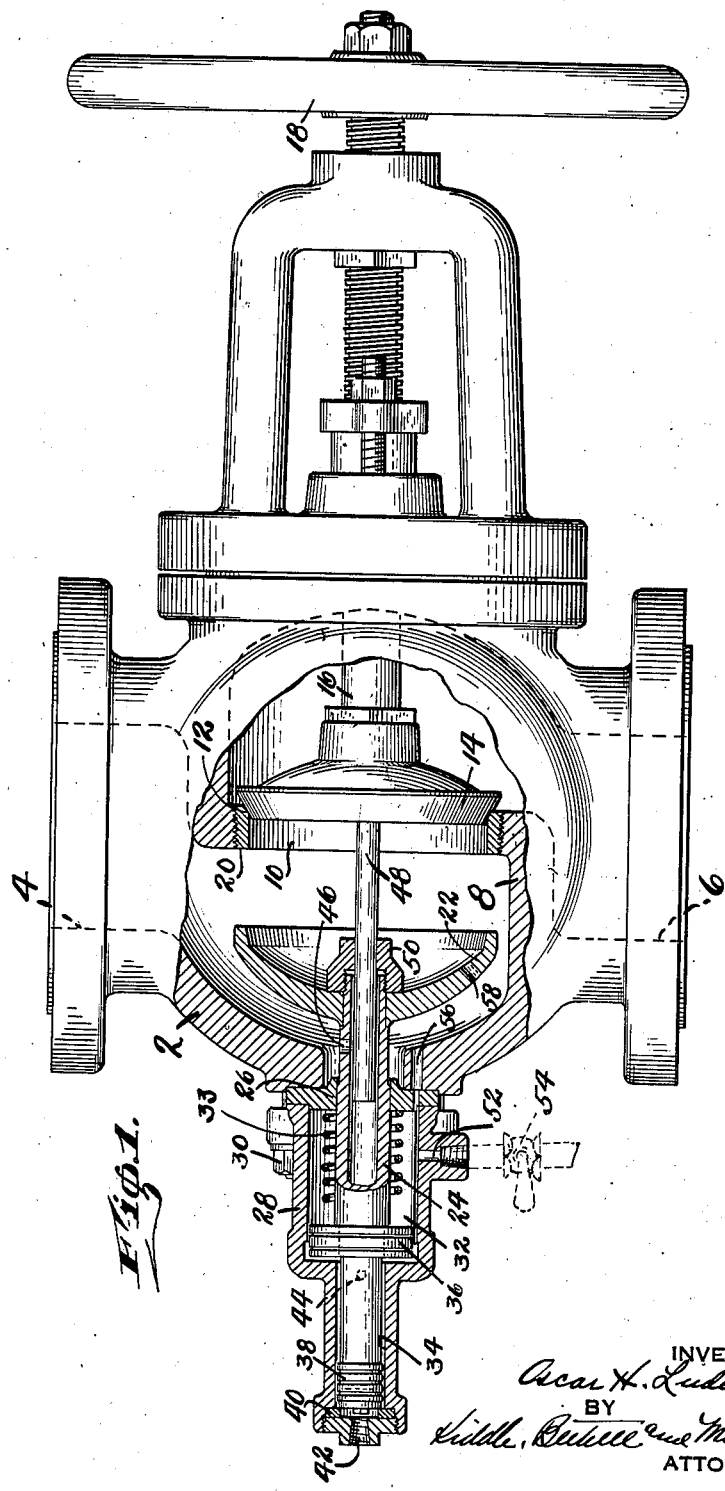
Figure 2:
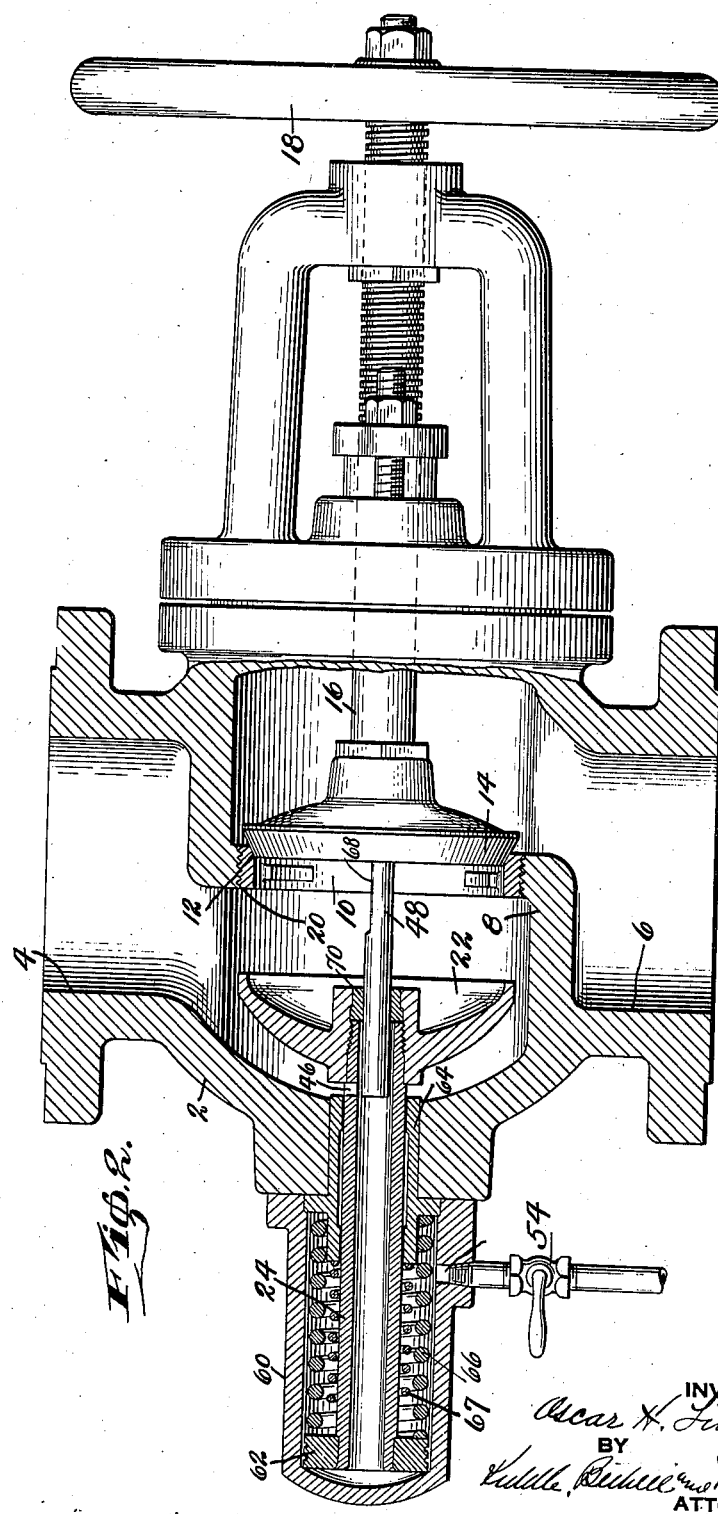

Two embodiments of my invention are illustrated in the accompanying drawings:

Fig. 1 is a part sectional elevational view of one embodiment of the invention; and Fig. 2 is a similar view of another embodiment.

Referring to the drawings in detail and first of all to Fig. 1: 2 designates a valve body, provided with inlet 4 and discharge 6 separated by a diaphragm 8. The diaphragm 8 is provided with a port 10 having a seat 12 for normally operated valve 14. This may be a throttle or stop valve, for example. This valve has been illustrated as provided with a stem 16 and handwheel 18 for manual operation.

On the side of the port 10 opposite the seat 12 is a seat 20 for a separate or emergency valve 22. This valve is mounted on the inner end of a hollow stem 24 extending in line with the valve stem 16 for the normally operating valve 14. The stem 24 slides in a bearing 26 as the valve 22 opens and closes. This bearing is unpacked and may be bronze, for example, and by reason of my novel construction no stuffing box is required. The bearing 26 is held against displacement by a cylindrical cap 28 which is bolted to the valve body 2 by bolts 30. The cap 28 is shaped internally to provide an inner chamber or cylinder 32 and an outer chamber or cylinder 34.

Pistons 36 and 38 are provided for the cylinders 32 and 34, respectively. These pistons are carried by the valve stem 24 and I term them "clearance" pistons inasmuch as they have merely a loose fit in their cylinders.

The outer end of the valve stem 24 is capped, and when the separate valve 22 is in open position, seats against a ground seat 40 provided at the outer end of the cylinder 34. This end of the cylinder 34 is provided with a port 42 which is open at all times to a pressure substantially lower than main line pressure, for example, the atmosphere.

The valve stem 24 is provided with a port 44 which is in communication with the chamber or cylinder 34, the stem being provided with another port 46 which is in direct communication with the interior of the valve body 2.

Extending from the front face of the normally operating valve 14 is a rod 48 which is in line with the valve stem 24 of the separate or emergency valve 22. This rod extends into the hollow valve stem 24 through a nut 50 screwed upon the inner end of the valve stem, so that the valve 14 is guided in its movement toward and away from the valve seat 12.

The cylinder 32 is provided with a vent port 52 equipped with a suitable valve 54. I have shown this valve adjacent the cylinder, but it will be understood, of course, that it may be located at a remote point, if desired.

To take care of condensate I may equip the cylinder 32 with drainage port 56.

With the pilot valve 54 closed, this valve controlling the vent port 52, it will be understood that the emergency or separate valve 22 will remain open, there being an unbalanced pressure condition even though the apparatus is handling fluid under pressure, the fluid not only passing through the valve body but also entering the cylinders or chambers 32 and 34. This unbalanced condition is due to the fact that the outer end of the cylinder 34 is open to pressure at all times which is substantially lower than the line pressure. Consequently fluid pressure is available in a direction to hold the emergency valve open.

To close the emergency valve it merely is necessary momentarily to open the vent port 52 by opening the pilot valve 54, thus venting the cylinder 32 and creating an unbalanced pressure in a direction to move the valve 22 forward until it seats. To reduce the impact of the valve 22 as it seats, I may provide within the cylinder 32 a compression spring 33 which is engaged by the clearance piston 36 before the valve seats.

The valve 22 will remain closed indefinitely unless the valve 14 be closed. Upon closure of the valve 14 and having closed the pilot valve 54 pressure will be built up on the valve 22 in a direction to open it, the steam or other fluid under pressure being admitted through the port 58, with which the valve 22 is provided, to the space between the two valves.

While the construction thus far described is exceedingly simple, I have simplified my construction even further in the embodiment of the invention illustrated in Fig. 2.

Referring to this embodiment of the invention, it will be seen that the hollow stem 24 of the emergency or separate valve 22 is provided with a port 46 which is always open so that pressure fluid is at all times free to flow through the valve stem and out the rear end thereof behind the clearance piston 62 of the cylinder 60. The bearing for the stem 24 has been designated 64, this bearing, which is packless, constituting the only friction part in the apparatus so fas as the valve 22 is concerned. The valve 22 is held open by a spring 66 surrounding the stem 24. As in the first described embodiment of my invention I may provide a cushioning spring 67 for reducing the impact of the valve as it closes on its seat 20.

As above mentioned, the valve 22 is held open by the spring 66 and the clearance piston 62 is surrounded by pressure fluid.

To close the valve 22, when the valve 14 is open, the pilot valve 54 in the line from the bottom of the cylinder 60 ahead of the clearance piston is momentarily opened. While for purposes of illustration I have shown this valve adjacent the cylinder it will be understood, of course, it may be located at a more remote point when remote control is desired. The opening of this valve vents the pressure medium from the cylinder 60 ahead of the piston 62. Substantially full pressure remains behind the piston, however, so that the pressure differential on the two faces of the piston 62 is sufficient to move the piston forward against the action of the spring 66 instantly to close the emergency valve. The pilot valve 54, it will be understood, may then be closed. To reopen the valve 22 the normally operating valve 14 is closed. With both valves 14 and 22 closed a recess 68 in the guide stem 48 carried by the valve 14 projects beyond the guide bushing 70 of the valve 22, thereby to function as a port admitting line pressure through port 46 to the space between the valves 22 and 14. The valve 22 will then immediately move to full open position under the action of the spring 66 ready for the next operating cycle.

It will be appreciated that in both embodiments of my invention there is nothing to "freeze" or stick; nothing to adjust or get out of order; and that the equipment will operate equally well with steam, gas, oil or other fluids.

It is to be understood that changes may be made in the details of construction above described within the spirit and scope of my invention.

What I claim is:

1. Valve mechanism for controlling the flow of pressure fluid through a conduit, said valve mechanism comprising in combination a valve in the conduit, a stem for said valve, a piston on said stem, a cylinder for said piston, said piston being of less diameter than said cylinder, said cylinder being in constant communication with said conduit, a bearing for the valve stem for maintaining said piston out of contact with the walls of said cylinder whereby upon the entry of pressure fluid to said cylinder said fluid will contact both faces of the piston, a spring at the valve side of said piston for opening the valve, and pressure-relief means for relieving the fluid pressure at the valve side of said piston to effect fluid-pressure closure of the valve against the action of said spring.

2. Valve mechanism for controlling the flow of pressure fluid through a conduit, said valve mechanism comprising in combination a valve in the conduit, and closing in the direction of flow of the pressure fluid through the conduit, a stem for said valve, a piston carried thereby, a cylinder for said piston in constant communication with said conduit, said piston being of less diameter than said cylinder, a bearing for the valve stem maintaining the piston out of contact with the walls of said cylinder, whereby pressure fluid in the cylinder will contact both faces of the piston, and pressure-relief means for relieving the fluid pressure at the valve side of the said piston to effect fluid-pressure closure of the valve.

3. Valve mechanism for controlling the flow of pressure fluid through a conduit, said valve mechanism comprising in combination a valve in the conduit, and closing in the direction of flow of the pressure fluid through the conduit, a hollow stem for said valve, a piston carried thereby, a cylinder for said piston in constant communication with said conduit through said hollow valve stem, said piston being of less diameter than said cylinder, a bearing for the valve stem maintaining the piston out of contact with the walls of said cylinder, whereby pressure fluid in the cylinder will contact both faces of the piston, pressure-relief means for relieving the fluid pressure at the valve side of the said piston to effect fluid-pressure closure of the valve, and a spring for opening said valve upon closure of said pressure relief means and the restoration of the initial fluid pressure upon the valve side of said piston.

OSCAR H. LUDEMAN.